UNITED STATES PATENT OFFICE.

JOSEPH FREDERIC HOUSTON, OF PHILADELPHIA, PENNSYLVANIA.

COMPOUND FOR WAXING OR LUBRICATING YARNS AND THREADS.

1,277,215.

Specification of Letters Patent. Patented Aug. 27, 1918.

No Drawing. Application filed April 26, 1918. Serial No. 231,003.

*To all whom it may concern:*

Be it known that I, JOSEPH FREDERIC HOUSTON, a citizen of the United States, residing in the city and county of Philadelphia, State of Pennsylvania, have invented a new and useful Compound for Waxing or Lubricating Yarns and Threads, of which the following is a specification.

My invention has relation to a certain new composition of matter for waxing threads and yarns invented by me and adapted for use on the machine forming the subject-matter of United States Letters Patent, No. 1,230,714, granted June 19th, 1917, in which I made use of a waxing compound to constitute the core or filler of a hollow cone formed preferably of glass through which a thread to be waxed is drawn and in the process of being drawn "ballooned" or centrifugally thrown into contact with the waxing compound so as to be waxed.

While this is the principal purpose to which my compound is applicable, I do not of course restrict myself to its use in connection with my patented invention referred to, but contemplate making use of it in other fields of manufacture or general utility to which a waxing compound is applicable.

The compound itself consists of the three ingredients of paraffin wax, sperm oil and cocoa butter, which as a composition or compound I believe to be new.

In compounding the mixture, the wax is the major ingredient, the cocoa butter the next largest in terms of quantity, and the sperm oil the smallest.

While I do not restrict myself to specific proportions, I prefer to make use of one pound of paraffin wax,—of from one-quarter to one ounce of cocoa butter,—and of one-quarter to one-half ounce of sperm oil.

These ingredients are commingled by any preferred mixing or agitating device or process,—the paraffin wax being liquefied before the addition to it of the oil and butter,—with the result that after the admixture has become complete the compound itself will be of approximately the normal consistency of paraffin wax.

Having thus described my invention, what I claim as new and desire to secure by Letters Patent, is:—

1. A waxing compound comprising a mixture of paraffin wax, cocoa butter and sperm oil.

2. A waxing compound comprising a mixture of paraffin wax, cocoa butter and sperm oil, produced by the commingling of sperm oil and cocoa butter with liquefied paraffin wax.

3. A waxing compound comprising a mixture of paraffin wax, cocoa butter and sperm oil, in substantially the following proportions:—paraffin wax, one pound,—cocoa butter, one quarter ounce to one ounce,—and sperm oil, one quarter ounce to one-half ounce.

In testimony whereof I have hereunto signed my name this 25th day of April, 1918.

JOSEPH FREDERIC HOUSTON.

In the presence of—
J. BONSALL TAYLOR,
C. D. McVAY.